(12) United States Patent
Shaw et al.

(10) Patent No.: US 9,922,675 B1
(45) Date of Patent: Mar. 20, 2018

(54) OPTICAL DISK DRIVE WITH MULTIPLE OPTICAL PICK-UP HEADS

(71) Applicants: LITE-ON ELECTRONICS (GUANGZHOU) LIMITED, Guangzhou (CN); LITE-ON TECHNOLOGY CORPORATION, Taipei (TW)

(72) Inventors: Howard Yuen-Ho Shaw, Taipei (TW); Ming-Chun Tsao, Taipei (TW); Ming-Hung Chung, Taipei (TW); Shih-Ming Hsu, Taipei (TW)

(73) Assignees: LITE-ON ELECTRONICS (GUANGZHOU) LIMITED, Guangzhou (CN); LITE-ON ELECTRONICS CORPORATION, Taipei (TW)

( * ) Notice: Subject to any disclaimer, the term of this patent is extended or adjusted under 35 U.S.C. 154(b) by 0 days.

(21) Appl. No.: 15/647,296

(22) Filed: Jul. 12, 2017

(30) Foreign Application Priority Data

Apr. 24, 2017 (CN) .......................... 2017 1 0272531

(51) Int. Cl.
*G11B 7/08* (2006.01)
*G11B 7/085* (2006.01)
*G11B 7/09* (2006.01)

(52) U.S. Cl.
CPC .......... *G11B 7/082* (2013.01); *G11B 7/08582* (2013.01); *G11B 7/0935* (2013.01)

(58) Field of Classification Search
None
See application file for complete search history.

(56) References Cited

U.S. PATENT DOCUMENTS

| | | | | |
|---|---|---|---|---|
| 4,788,671 A | * | 11/1988 | Kanda | G11B 7/0037 360/86 |
| 5,172,370 A | * | 12/1992 | Suzuki | G11B 7/08594 369/199 |
| 5,251,201 A | * | 10/1993 | Nomura | G11B 7/08 369/195 |
| 5,521,899 A | * | 5/1996 | Taki | G11B 17/0434 369/199 |
| 6,021,100 A | * | 2/2000 | Fujita | G11B 11/10532 369/13.11 |

(Continued)

FOREIGN PATENT DOCUMENTS

CN 104934047 A 9/2015

*Primary Examiner* — Will J Klimowicz
(74) *Attorney, Agent, or Firm* — McClure, Qualey & Rodack, LLP

(57) ABSTRACT

An optical disk drive with multiple optical pick-up heads is provided. The optical disk drive includes an upper cover, a base, a first carrier member, a second carrier member, a first limiting member, and a second limiting member. The base is disposed under the upper cover. The first carrier member disposed on the base and has a first optical pick-up head. The second carrier member is disposed on the upper cover and has a second optical pick-up head. The first limiting member is used for disposing the first end of the second carrier member on the upper cover. The second limiting member is used for disposing the second end of the second carrier member on the upper cover. The length of the first limiting member is larger than that of the second limiting member.

10 Claims, 5 Drawing Sheets

(56) References Cited

U.S. PATENT DOCUMENTS

| | | | | |
|---|---|---|---|---|
| 7,188,349 B2* | 3/2007 | Ezawa | ................... | G11B 7/08 720/669 |
| 7,213,251 B2* | 5/2007 | Park | ................... | G11B 7/082 720/671 |
| 2005/0108741 A1* | 5/2005 | Cookson | ............ | G11B 7/08594 720/659 |
| 2005/0125817 A1* | 6/2005 | Ohno | ................... | G11B 7/082 720/675 |
| 2008/0101184 A1* | 5/2008 | Van Brocklin | ...... | G11B 17/056 369/47.49 |
| 2008/0184278 A1* | 7/2008 | Leigh | ................ | G11B 7/08582 720/601 |
| 2014/0310731 A1* | 10/2014 | Takasawa | ........... | G11B 17/0284 720/604 |
| 2014/0310732 A1* | 10/2014 | Goto | ................ | G11B 17/0284 720/604 |

* cited by examiner

US 9,922,675 B1

OPTICAL DISK DRIVE WITH MULTIPLE OPTICAL PICK-UP HEADS

This application claims the benefit of People's Republic of China application Serial No. 201710272531.X, filed Apr. 24, 2017, the subject matter of which is incorporated herein by reference.

BACKGROUND OF THE INVENTION

Field of the Invention

The invention relates in general to an optical disk drive, and more particularly to an optical disk drive with multiple optical pick-up heads.

Description of the Related Art

Along with the increase in data volume, a larger storage space is required, and the storage space of optical disk must be increased. Therefore, an optical disk whose both sides can store data is provided. Since the distance from the optical pick-up head (OPU) to an optical disc varies with the thickness of the optical disc. Therefore, when the optical pick-up head reads an optical disc, the best laser focus length cannot be maintained, and the reading quality will be unsatisfactory.

SUMMARY OF THE INVENTION

The invention is directed to an optical disk drive with multiple optical pick-up heads capable of being adapted to different thicknesses of optical discs.

According to one embodiment of the present invention, an optical disk drive is provided. The optical disk drive includes an upper cover, a base, a first carrier member, a second carrier member, a first limiting member, and a second limiting member. The base is disposed under the upper cover. The first carrier member disposed on the base and has a first optical pick-up head. The second carrier member is disposed on the upper cover and has a second optical pick-up head. The first limiting member is used for disposing the first end of the second carrier member on the upper cover. The second limiting member is used for disposing the second end of the second carrier member on the upper cover, wherein the length of the first limiting member is larger than that of the second limiting member.

According to another embodiment of the present invention, an optical disk drive is provided. The optical disk drive includes an upper cover, a base, a first carrier member, and a second carrier member. The base is disposed under the upper cover. The first carrier member is disposed on the base and has a first optical pick-up head. The second carrier member is disposed on the upper cover and has a second optical pick-up head. Before an optical disc is loaded into the optical disc drive, a first gap is formed between a first end of the second carrier member and the upper cover, and a second gap smaller than the first gap is formed between a second end of the second carrier member and the upper cover.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
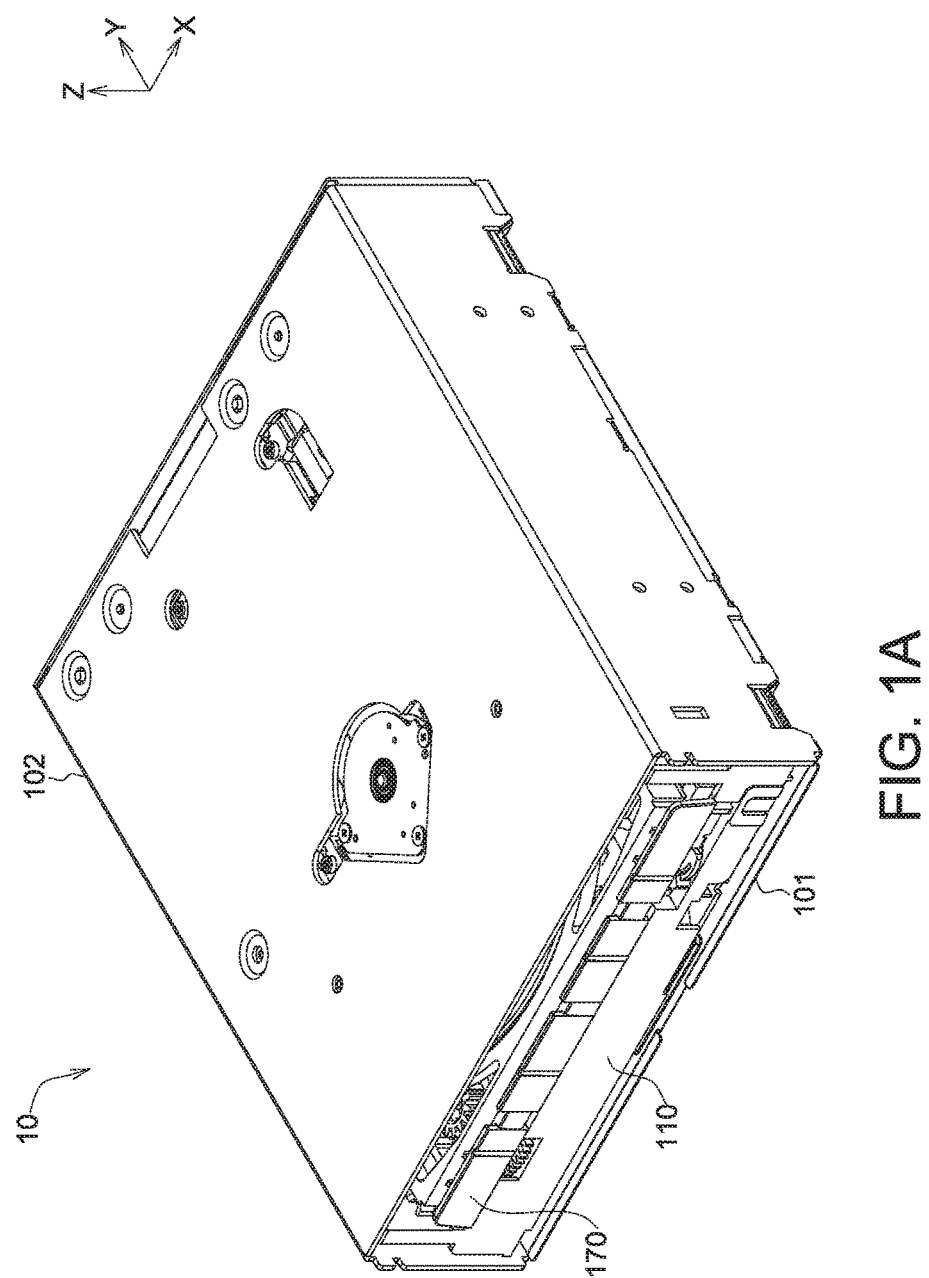
FIG. 1A is a schematic diagram of an optical disk drive according to an embodiment of the invention.
Figure 1B:
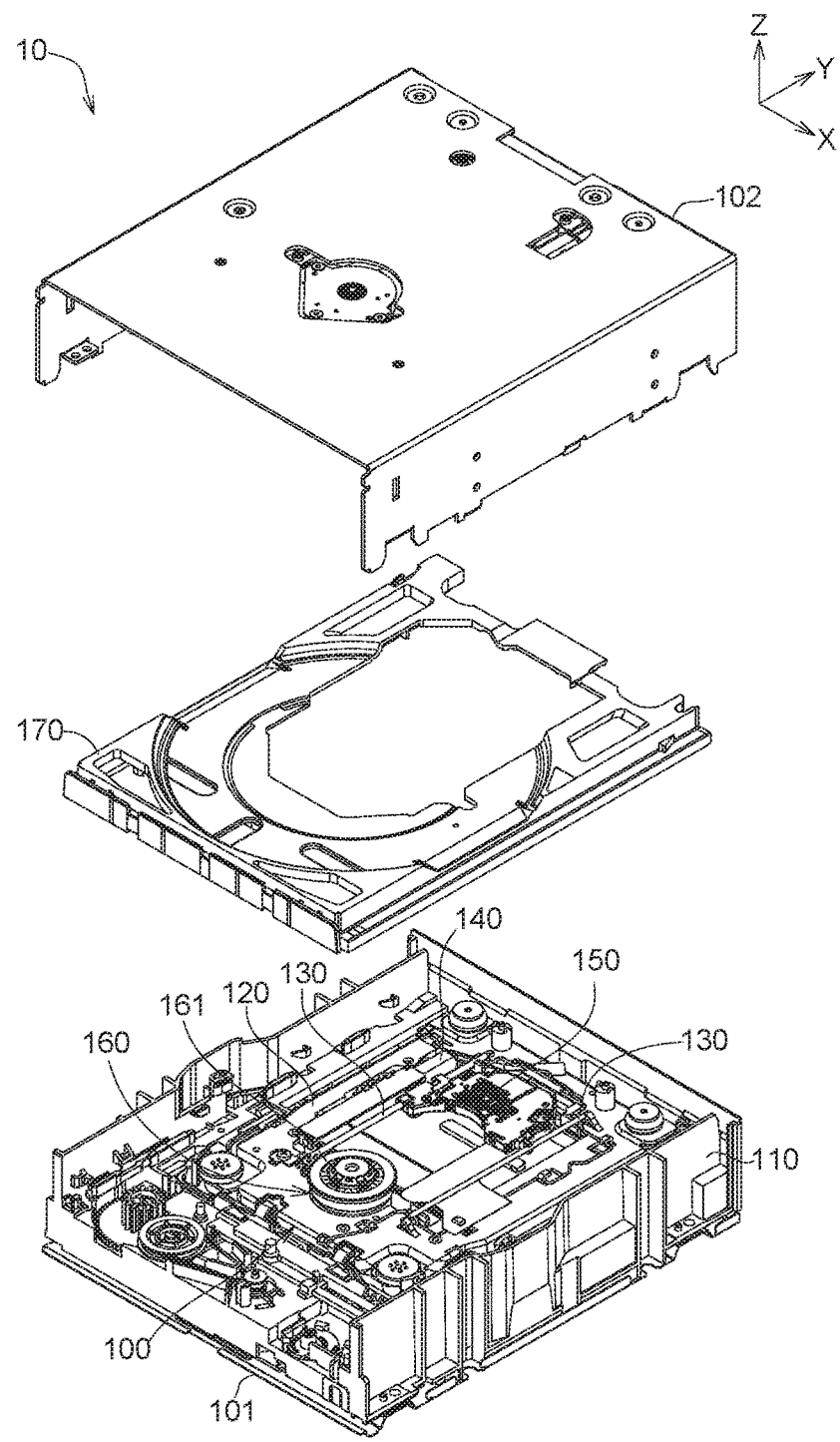
FIG. 1B is an explosion diagram of the optical disk drive of FIG. 1A.
Figure 2:
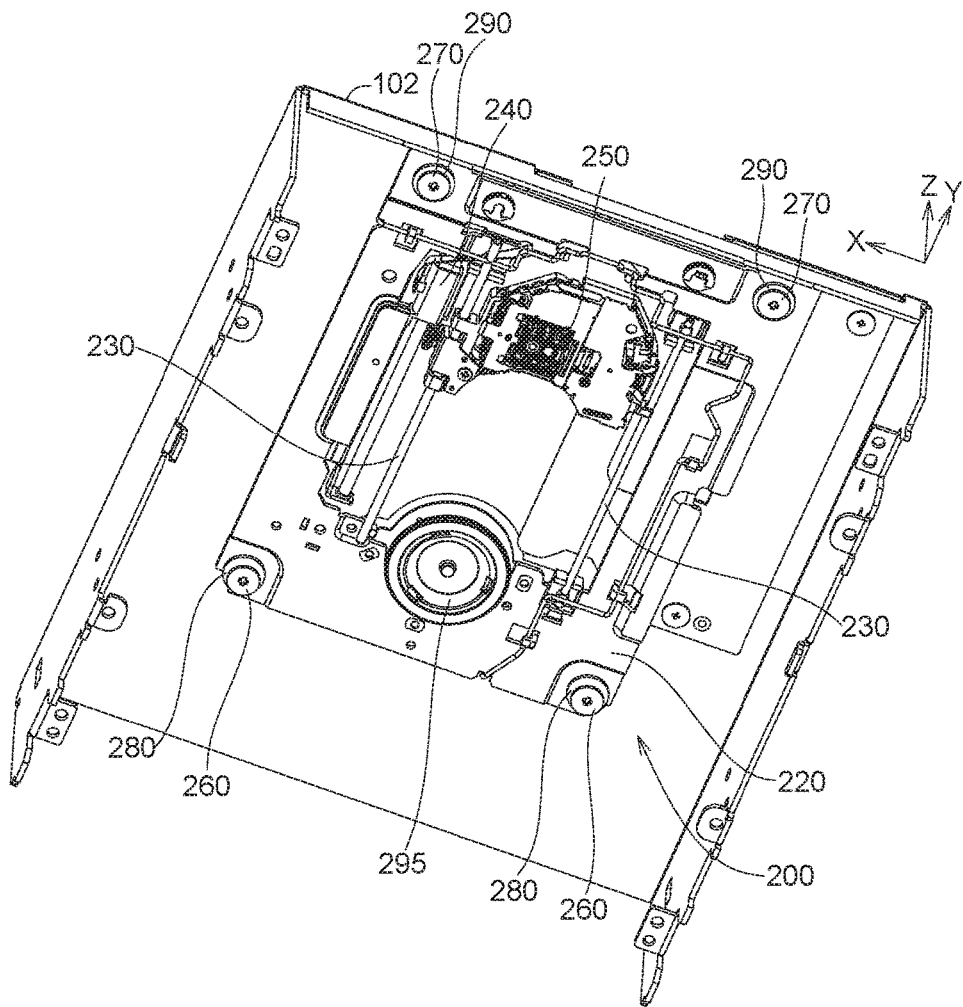
FIG. 2 is a schematic diagram of the upper body of FIG. 1A.

Refer to FIGS. 1A, 1B and 2. FIG. 1A is a schematic diagram of an optical disk drive 10 according to an embodiment of the invention. FIG. 1B is an explosion diagram of the optical disk drive 10 of FIG. 1A. FIG. 2 is a schematic diagram of the upper body 200 of FIG. 1A. The optical disk drive 10 includes a lower body 100 and an upper body 200, a base 110, a disk tray 170, a lower cover 101 and an upper cover 102. The base 110 is disposed between the lower cover 101 and the upper cover 102. The lower cover 101 can be realized by a bottom plate, and the upper cover 102 can be realized by a U-shaped plate. The base 110 can be realized by a frame for supporting the disk tray 170 and the lower body 100. The lower body 100 is disposed on the base 110. The upper body 200 is disposed on the upper cover 102. The disk tray 170 is slidably disposed on the base 110 for loading the optical disk 20 (illustrated in FIG. 4A) into the optical disk drive 10.

The lower body 100 includes a first carrier member 120, at least a first sliding rail 130, a first driver 140, a first optical pick-up head 150 and a spindle motor 160. The first carrier member 120 is disposed on the base 110. The first sliding rail 130 is disposed on the first carrier member 120. The first optical pick-up head 150 is slidably disposed on the first sliding rail 130. The first driver 140 is disposed on the first carrier member 120 for moving the first optical pick-up head 150 to a read position along the first sliding rail 130. The first driver 140 can be realized by a motor. The spindle motor 160 is disposed on the first carrier member 120 and has a turntable 161 for carrying the optical disk. The spindle motor 160 drives the turntable 161 and the optical disk 20 loaded on the turntable 161 to rotate together, such that the first optical pick-up head 150 can read data stored in different areas of the optical disk 20.

In the drawings, the X, Y and Z directions are vertical to each other, wherein the disk tray 170 can be movably disposed on the base 110 along the +/−Y direction. For example, the disk tray 170 is loaded into the optical disk drive 10 along the +Y direction or is ejected from the optical disk drive 10 along the −Y direction. Besides, the first carrier member 120 can be made of a metal and can be formed by the stamping method.

Figure 3:
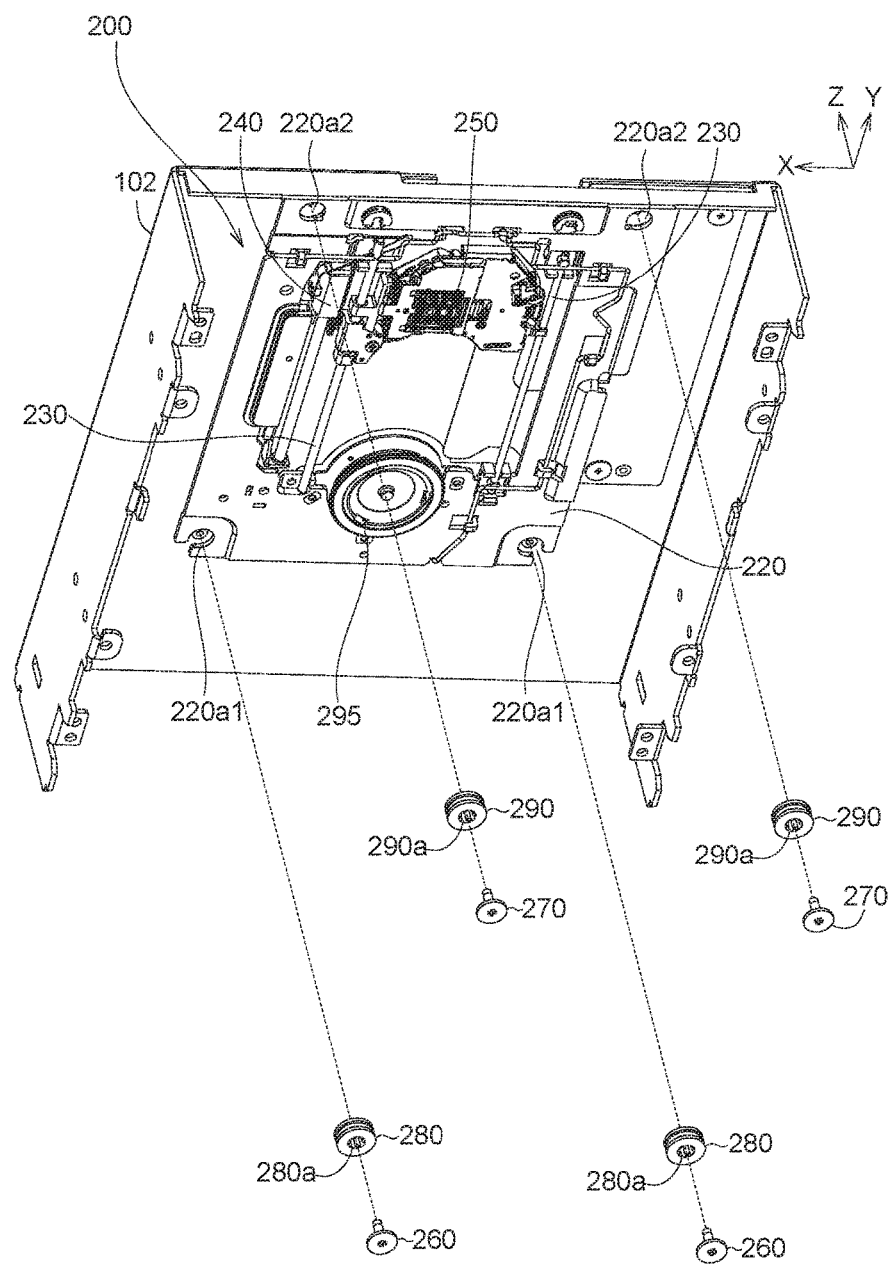
FIG. 3 an explosion diagram of the upper body of FIG. 2.

Refer to FIGS. 2 and 3. FIG. 3 is an explosion diagram of the upper body of FIG. 2. The upper body 200 includes a second carrier member 220, at least a second sliding rail 230, a second driver 240, a second optical pick-up head 250, at least a first limiting member 260, at least a second limiting member 270, at least a first buffering member 280, at least a second buffering member 290 and a camper 295.

The second carrier member 220 is disposed on the upper cover 102. The material and formation method of the second carrier member 220 are similar to that of the first carrier member 120, and the similarities are not repeated here. The second sliding rail 230 is disposed on the second carrier member 220, and the second optical pick-up head 250 is slidably disposed on the second sliding rail 230. The second driver 240 is disposed on the second carrier member 220 for moving the second optical pick-up head 250 to a read position along the second sliding rail 230. The second driver 240 can be realized by a motor. The clamper 295 is rotatably disposed on the second carrier member 220 for clamping the optical disc on the turntable 161.

As indicated in FIG. 3, the second carrier member 220 has at least a first opening 220a1 and at least a second opening 220a2. The first buffering member 280 and the second buffering member 290 are disposed in the first opening 220a1 and the second opening 220a2, respectively. The first limiting member 260 and the second limiting member 270 can pass through the through hole 280a of the first buffering member 280 and the through hole 290a of the second buffering member 290 respectively to disposed the second carrier member 220 on the upper cover 102.

Figure 4A:
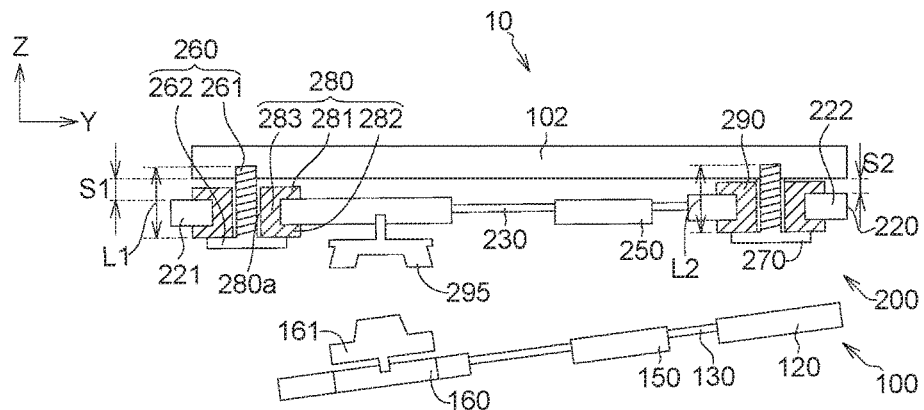
FIG. 4A is a partial cross-sectional view of the optical disk drive of FIG. 1A (before loading an optical disc).
Figure 4B:
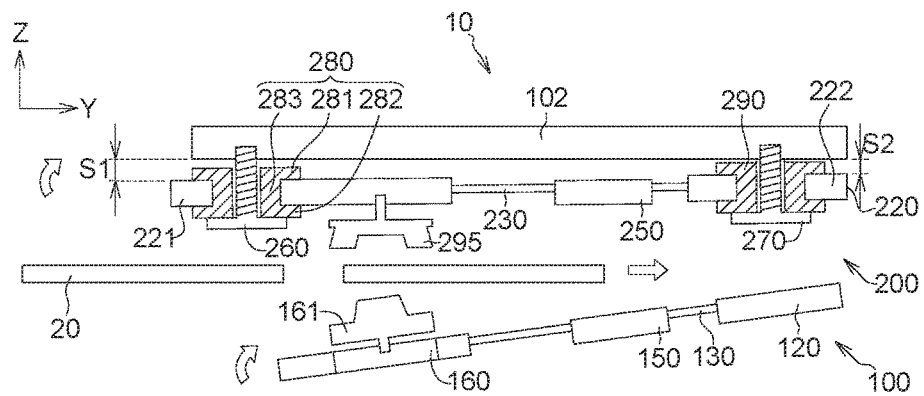
FIG. 4B is a cross-sectional view of the optical disc being loaded into the optical disk drive of FIG. 4A.
Figure 4C:
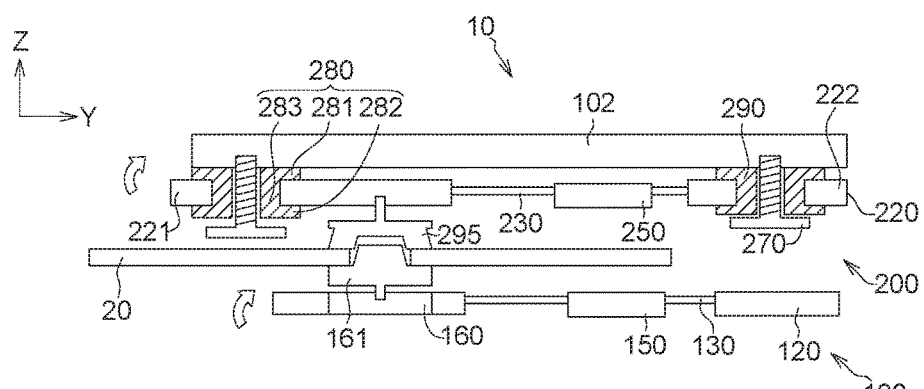
FIG. 4C is a cross-sectional view of the optical disc of FIG. 4B being clamped inside the optical disk drive.

Refer to FIGS. 4A~4C. FIG. 4A is a partial cross-sectional view of the optical disk drive 10 of FIG. 1A (before loading an optical disc). FIG. 4B is a cross-sectional view of the optical disc 20 being loaded into the optical disk drive 10 of FIG. 4A. FIG. 4C is a cross-sectional view of the optical disc 20 of FIG. 4B being clamped inside the optical disk drive 10. FIGS. 4A~4C have been simplified to avoid the diagrams being too complicated.

As indicated in FIG. 4A, the first limiting member 260 includes a fixing end 261 and a limiting end 262. The first limiting member 260 is fixed to the upper cover 102 by the fixing end 261, and the outer diameter of the limiting end 262 is larger than the inner diameter of the through hole 280a of the first buffering member 280, such that the physical portion of the first buffering member 280 is limited between the limiting end 262 and the fixing end 261. In an embodiment, the first limiting member 260 can be realized by an element with threads such as a screw, but the present invention embodiment is not limited thereto. In other embodiments, the fixing end 261 of the first limiting member 260 does not have threads, and the fixing end 261 can be fixed to the upper cover 102 by way of engagement. Besides, the structure of the second limiting member 270 is similar to that of the first limiting member 260, and the similarities are not repeated here. The connection relationship between the second limiting member 270 and the second buffering member 290 is similar to the connection relationship between the first limiting member 260 and the first buffering member 280, and the similarities are not repeated here.

As indicated in FIG. 4A, the first buffering member 280 includes a first portion 281, a second portion 282 and a connecting portion 283, wherein the connecting portion 283 is disposed between the first portion 281 and the second portion 282 and connects the first portion 281 and the second portion 282. As indicated in FIG. 4A, the first portion 281, the second portion 282 and the connecting portion 283 can form an H-shaped structure, but the present invention embodiment is not limited thereto. The through hole 280a of the first buffering member 280 passes through the first portion 281, the second portion 282 and the connecting portion 283. The first portion 281 disposed between the second carrier member 220 and the upper cover 102 is used as a buffer between the upper cover 102 and the second carrier member 220 to absorb the vibration. The second portion 282, connected to the first portion 281 through the connecting portion 283 and disposed between the second carrier member 220 and the limiting end 262 of the first limiting member 260, is used as a buffer between the limiting end 262 of the first limiting member 260 and the second carrier member 220 to absorb vibration. Due to the first buffering member 280, the noises caused by the collision between the second carrier member 220 and the upper cover 102 and the first limiting member 260 can be reduced or even eliminated. Moreover, the structure of the second buffering member 290 is similar to that of the first buffering member 280, and the similarities are not repeated here.

As indicated in FIG. 4A, the second carrier member 220 has a first end 221 and a second end 222 disposed oppositely, wherein the optical disc 20 is loaded into the optical disk drive 10 in a direction proceeding towards the second end 222 from the first end 221. The first limiting member 260 is disposed at the first end 221 of the second carrier member 220, the second limiting member 270 is disposed at the second end 222 of the second carrier member 220, and the length L1 of the first limiting member 260 is larger than the length L2 of the second limiting member 270.

As indicated in FIG. 4A, before the optical disc 20 is loaded into the optical disk drive, the first buffering member 280 and the second buffering member 290 lean on the limiting end of the first limiting member 260 and the limiting end of the second limiting member 270, respectively; a first gap S1 is formed between the first end 221 of the second carrier member 220 and the upper cover 102; a second gap S2 is formed between the second end 222 of the second carrier member 220 and the upper cover 102. Since the length L1 of the first limiting member 260 is larger than the length L2 of the second limiting member 270, the second gap S2 is smaller than the first gap S1. In the embodiments of the present invention, the length L1 of the first limiting member 260 and the length L2 of the second limiting member 270 are not restricted, and any lengths would do as long as the lengths enable the second gap S2 to be smaller than the first gap S1. For example, the relationship between the second gap S2 and the first gap S1 can be determined according to the length by which the fixing end 261 of the first limiting member 260 enters the upper cover 102 and the length by which the fixing end of the second limiting member 270 enters the upper cover 102. Under such design, the length L1 of the first limiting member 260 can either be equivalent or non-equivalent to the length L2 of the second limiting member 270. The first gap S1 at least enables the optical disc drive to be adapted to different thicknesses of the optical disc 20, and detailed descriptions are disclosed below.

As indicated in FIG. 4B, the optical disc 20 is loaded into the space between the upper body 200 and the lower body 100. During the loading process, the disk tray 170 loaded with the optical disc 20 (the disk tray 170 is illustrated in FIG. 1B) moves towards the +Y direction and is driven by a driving mechanism (not illustrated), such that the first carrier member 120 moves towards the ±Z direction at the same time until the optical disc 20 enters the space between the first carrier member 120 of the lower body 100 and the second carrier member 220 of the upper body 220 and is clamped between the turntable 161 of the lower body 100 and the clamper 295 of the upper body 200. When the first carrier member 120 moves along the +Z direction and the clamper 295 clamps the optical disc 20, the first carrier member 120 also pushes the second carrier member 220 to move towards the +Z direction, such that the gap between the first end 221 of the second carrier member 220 and the upper cover 102 becomes a third gap smaller than the first gap S1.

As indicated in FIG. 4C, the optical disc 20 enters the space between the first carrier member 120 of the lower body 100 and the second carrier member 220 of the upper body 220 and is clamped between the turntable 161 of the lower body 100 and the clamper 295 of the upper body 200. The clamper 295 is pivotally connected to the second carrier member 220 using the Z direction as the axis of rotation. After the optical disc 20 is clamped, the spindle motor 160 of the lower body 100 drives the turntable 161, the clamper 295 and the optical disc 20 to rotates using the Z direction as the axis of rotation, the first driver 140 of the lower body 100 (the first driver 140 is illustrated in FIG. 1B) and the second driver 240 of the upper body 200 (the second driver 240 is illustrated in FIG. 3) control the first optical pick-up head 150 and the second optical pick-up head 250 to read data from the top side and the bottom side of the optical disc 20, respectively. In another embodiment, one of the first driver 140 and the second driver 240 controls the corresponding optical pick-up head to read data from single side of the optical disc 20. In the present embodiment, data can be stored on single side or both sides of the optical disc 20.

The first gap S1 is formed between the first end 221 of the second carrier member 220 and the upper cover 102. During the process of clamping the optical disc 20, the first carrier member 120 pushes the second carrier member 220 to move towards the +Z direction to provide a clamping space corresponding to the thickness of the optical disc, such that the optical disk drive 10 can be self-adapted to different thicknesses of the optical disc wherein the clamping space refers to the space between the turntable 161 and the clamper 295. For the same optical disk drive 10, the first gap S1 enables the first end 221 of the second carrier member 220 to adjust along the +/−Z direction. Therefore, although the optical disc 20 loaded into the optical disk drive 10 may have different thicknesses, the optical discs 20 can all be tightly clamped between the turntable 161 of the lower body 100 and the clamper 295 of the upper body 200.

To summarize, the optical disk drive disclosed in above embodiments of the present invention can be adapted to different thicknesses of optical discs, such that the distance from the optical pick-up head to the optical disc can maintain consistent, and the laser focus length of the optical pick-up head can be maintained, such that best reading quality can be achieved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disk drive with a plurality of optical pick-up heads, comprising:
    an upper cover;
    a base disposed under the upper cover;
    a first carrier member disposed on the base and having a first optical pick-up head;
    a second carrier member disposed on the upper cover and having a second optical pick-up head;
    a first limiting member configured to dispose a first end of the second carrier member on the upper cover; and
    a second limiting member configured to dispose a second end of the second carrier member on the upper cover, wherein a length of the first limiting member is larger than that of the second limiting member.

2. The optical disk drive according to claim 1, wherein the first limiting member has a fixing end and a limiting end, and the fixing end is fixed to the upper cover.

3. The optical disk drive according to claim 2, further comprising a first buffering member, wherein the first buffering member has a through hole, the first limiting member passes through the through hole, and the first buffering member comprises:
    a first portion disposed between the second carrier member and the upper cover; and
    a second portion connected to the first portion and disposed between the second carrier member and the limiting end of the first limiting member.

4. The optical disk drive according to claim 1, wherein a direction from the first end of the second carrier member toward the second end is an optical disc loading direction.

5. The optical disk drive according to claim 1, wherein before an optical disk is loaded into the optical disc drive, there is a first gap between the first end of the second carrier member and the upper cover, and when the optical disk is loaded into the optical disc drive, there is a third gap between the first end of the second carrier member and the upper cover, and the third gap is smaller than the first gap.

6. An optical disk drive with a plurality of optical pick-up heads, comprising:
    an upper cover;
    a base disposed under the upper cover;
    a first carrier member disposed on the base and having a first optical pick-up head;
    a second carrier member disposed on the upper cover and having a second optical pick-up head; and
    wherein before an optical disk is loaded into the optical disc drive, there is a first gap between a first end of the second carrier member and the upper cover, there is a second gap between a second end of the second carrier member and the upper cover, and the first gap is larger than the second gap.

7. The optical disk drive according to claim 6, further comprising a first limiting member configured to dispose the first end of the second carrier member on the upper cover, wherein the first limiting member has a fixing end and a limiting end, and the fixing end is fixed to the upper cover.

8. The optical disk drive according to claim 7, further comprising a first buffering member, wherein the first buffering member has a through hole, the first limiting member passes through the through hole, and the first buffering member comprises:
    a first portion disposed between the second carrier member and the upper cover; and
    a second portion connected to the first portion and disposed between the second carrier member and the limiting end of the first limiting member.

9. The optical disk drive according to claim 6, wherein a direction from the first end of the second carrier member toward the second end is an optical disc loading direction.

10. The optical disk drive according to claim 6, wherein when the optical disk is loaded into the optical disc drive, there is a third gap between the first end of the second carrier member and the upper cover, and the third gap is smaller than the first gap.

\* \* \* \* \*